United States Patent [19]

Carlisle

[11] 4,430,069
[45] Feb. 7, 1984

[54] METHOD AND APPARATUS FOR SEALING AND CUTTING PLASTIC FILMS

[76] Inventor: Richard S. Carlisle, Box 307, Rye, N.Y. 10580

[21] Appl. No.: 244,065

[22] Filed: Mar. 16, 1981

Related U.S. Application Data

[63] Continuation-in-part of Ser. No. 941,721, Sep. 12, 1978, Pat. No. 4,256,024, Ser. No. 714,746, Aug. 16, 1976, Pat. No. 4,113,169, and Ser. No. 427,443, Dec. 21, 1973, Pat. No. 3,975,885, which is a continuation-in-part of Ser. No. 231,288, Mar. 2, 1972, Pat. No. 3,815,794.

[51] Int. Cl.³ .............................................. B31B 1/64
[52] U.S. Cl. ............................. 493/203; 156/583.3; 493/207; 493/209
[58] Field of Search ............... 156/583.3, 583.7, 583.9, 156/583.2, 583.1, 515; 493/207, 203, 196, 206, 209

[56] References Cited

U.S. PATENT DOCUMENTS

| | | | |
|---|---|---|---|
| 2,552,353 | 5/1951 | Troth et al. | 493/341 X |
| 2,714,416 | 8/1955 | Fener | 154/42 |
| 2,743,761 | 5/1956 | Snyder et al. | 156/583 |
| 3,166,459 | 1/1965 | Imhof | 156/583.3 X |
| 3,237,533 | 3/1966 | Dewyer | 493/203 X |
| 3,513,052 | 5/1970 | Ariyasu et al. | 156/251 |
| 3,687,789 | 8/1972 | Wheeler | 156/515 |
| 3,868,291 | 2/1975 | Benz et al. | 156/583.3 X |
| 3,947,198 | 3/1976 | Hutt | 493/203 X |
| 4,053,671 | 10/1977 | Carlisle | 428/157 |

Primary Examiner—James F. Coan

[57] ABSTRACT

Opposed strips of heat-sealable thermoplastic strips are advanced along a path past a pouch-forming and incomplete cut-out zone, a filling zone and a pouch-sealing and cut-off zone. Each incompletely cut-out pouch has a spout whose open end extends to opposed marginal bands of the strips. Nozzles are projected into the spouts at the filling zone. A tight fit of the nozzles in the spouts prevents escape of fluid around the nozzles during the filling operation. The marginal bands of the strips are gripped adjacent each spout to enable the nozzles to be pushed into the spouts. The filled pouches settle onto a conveyor while the marginal bands hold the open ends of the spouts at a higher level, preventing discharge of fluid from the spouts until the filled pouches are sealed. Sufficient height of the spout opening above the mean level of the filled body of each pouch tends to form a discharge-blocking pinch across the spout, and a still-higher level of the spout opening prevents the discharge of fluid by gravity. Filling nozzles extend in opposite directions toward the centerline of the strips for insertion into oppositely directed spouts where the pouches are formed at successive positions along the strips and each slender spout lies between the bodies of neighboring pouches. Multiple pouches can be formed simultaneously by multiple seam-forming and cut-out reciprocating dies. Composite cut-out dies, and seam-forming dies are heated to relatively high and lower temperatures, respectively, and the dies press the thermoplastic strips against a heat-resistant rubbery platen.

9 Claims, 15 Drawing Figures

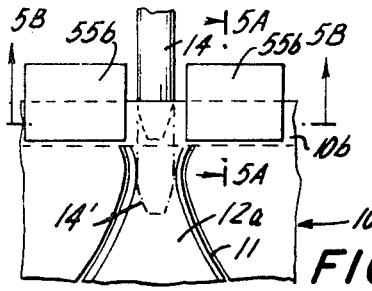
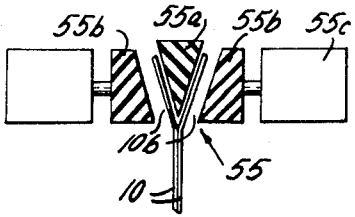
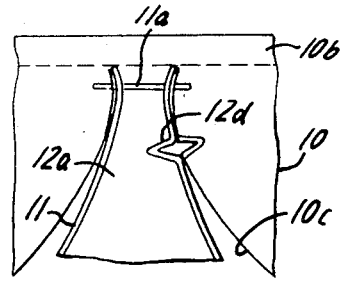
FIG.6
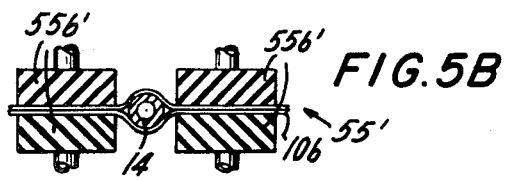
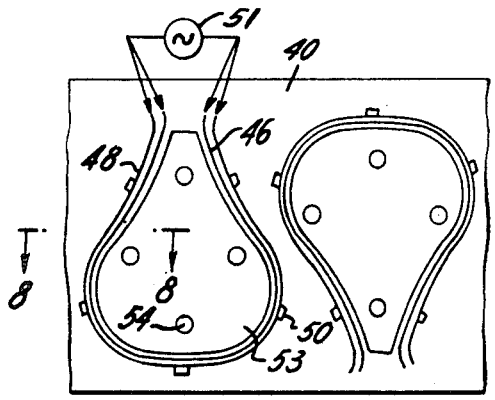
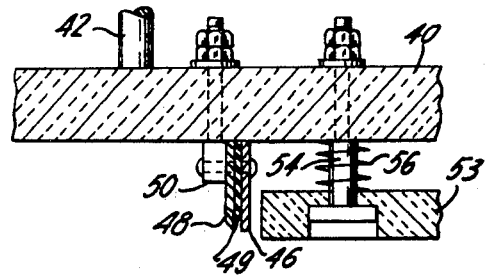
FIG.8
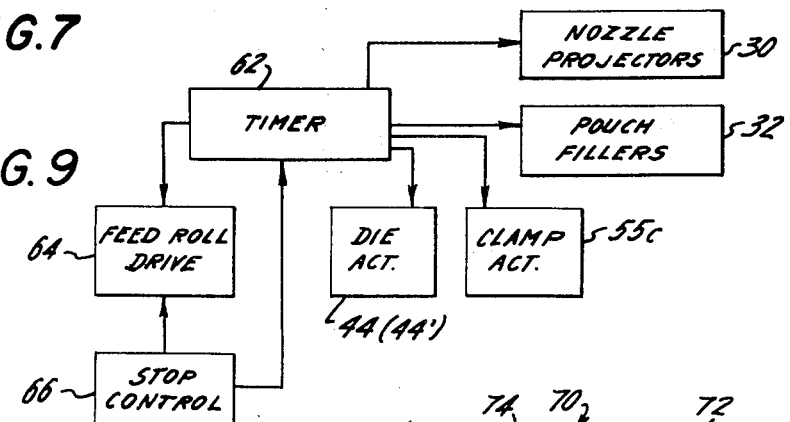
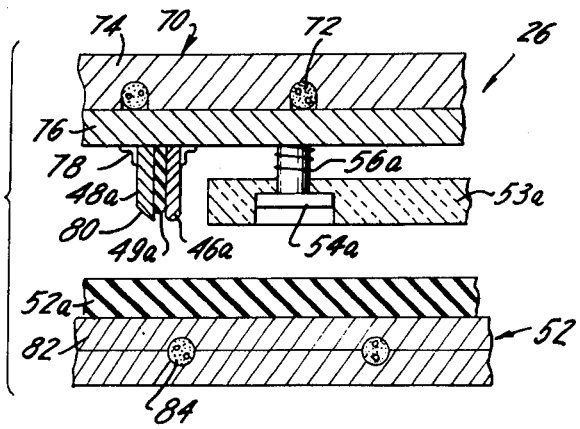

METHOD AND APPARATUS FOR SEALING AND CUTTING PLASTIC FILMS

This application is a continuation-in-part of Ser. No. 941,721 filed Sept. 12, 1978, now U.S. Pat. No. 4,256,024 issued Mar. 17, 1981, Ser. No. 714,746 filed Aug. 16, 1976 now U.S. Pat. No. 4,113,169, issued Sept. 12, 1978, and Ser. No. 427,443 filed Dec. 21, 1973, now U.S. Pat. No. 3,975,885 issued Aug. 24, 1976, which patents are continuation-in-part of Ser. No. 231,288 filed Mar. 2, 1972, now U.S. Pat. No. 3,815,794 issued June 11, 1974.

FIELD OF THE INVENTION

This invention relates to methods and apparatus for forming pouches of heat-sealable strips and for filling and sealing the pouches.

BACKGROUND OF THE INVENTION

The present invention is intended particularly for use in producing pouches of the type described in detail in my copending application Ser. No. 231,288, filed Mar. 2, 1972, and for filling and sealing such pouches. However, while it is specially intended for that purpose, and the detailed description which follows is in many particulars related to that purpose, it will be recognized that various features of the invention have more general application to other containers.

In the above-mentioned copending application, a variety of pouches are formed of opposed pairs of thermoplastic strips heat-sealed together along seams which, to best advantage, form the edge of the pouch. Each pouch has a fluid-discharge spout that is specially shaped to enable a releasable and reclosable seal to form across the spout. The kind of seam formed is such as to dispose the walls of the spouts essentially face-to-face when the pouch is empty, to promote formation of secure releasable seals. The pouch can be filled via the fluid-discharge spout or via a separate spout. Thereafter the opening used for filling the pouch is closed by a seam.

Methods and machines that use plastic films in forming and filling pouches of which I am aware are poorly suited to using the spouts of pouches as filling ports; they seem poorly suited to forming pouches having spouts whose walls are essentially face-to-face when empty for developing the releasable seals of application, Ser. No. 231,288, especially where the pouch is to be cut out along the seam; and they are unsuited to economical utilization of the plastic film in a form-fill machine where the pouches to be formed have slender spouts extending from wider pouch bodies. Further, available composite dies and techniques for forming seams and cutting along the seam outlines are complex in that they require elaborate operating mechanisms, or they are expensive because of the accuracy needed in making them, or they require heavy presses to operate them, especially where other-than-straight outlines are involved.

SUMMARY OF THE INVENTION

The present invention provides an improvement over the prior art in meeting the foregoing and other deficiencies of the prior art. The invention as outlined here meets many requirements, certain of which can be used to advantage where others are not required.

A pair of strips, especially thermoplastic strips, are united along seams that outline the walls of the pouch and, simultaneously, the pouch is parted from the strips so as to leave the end portion of a filling spout connected to the strips. Marginal bands along at least one edge of the opposed strips are free of seams and thus the marginal bands are separable from each other. (The word "opposed" is here used to signify face-to-face opposition of the strips or the marginal bands; and the word "opposite" is used below in referring to the edges of a single strip and, in like sense, to the "opposite" edges of a pair of "opposed" strips. Strips that are "opposed" need not have aligned edges.) Filling nozzles of the apparatus remain interposed between the opposed, seam-free marginal bands as the strips are fed to and beyond the filling zone, and the containers are filled when the filling spouts become aligned with the nozzles. However, the nozzles could be withdrawn from the margins of the strips entirely, if desired; but in that case, separators should be used to keep opposed marginal bands of the strips parted for enabling easy insertion of the nozzles into newly aligned spouts. After the pouches are filled, seams are formed across the openings and the pouches are parted from the strips.

To utilize the strips economically in making pouches having elongated spouts, the pouches are formed in a series along the strips with the spouts extending between the bodies of adjacent pouches. The spouts then extend alternately toward the opposite edges of the strips, and filling nozzles extend toward the center of the strips from the opposite edges thereof.

The filling nozzles are shaped to provide a close fit in the spouts so as to block escape of fluid around the outsides of the nozzles during the filling operation. The opposed margins of the strips are restrained in position while the nozzles are being thrust into the spouts, to assure reception of the nozzles into the spouts.

As the pouches become filled, the body portions of the pouches drop to a lower level. They are supported on a conveyor that is driven in synchronism with the feed of the strips. In this way the filled bodies of the pouches advance to the pouch-sealing zone in step with their spouts which are connected to the marginal bands. The weight of the pouch body is prevented from tugging excessively at the marginal bands.

As the pouch bodies become filled, their mean level rises above the level of the conveyor. The marginal bands and hence the open ends of the spouts are supported above the mean level, to induce formation of a pinch across each spout for blocking discharge of fluid after the filling operation and until the spout is closed by a seam. The level of the marginal bands above the conveyor can also be made high enough to prevent gravity discharge of fluid, so as not to depend on formation of a flow-blocking pinch.

Formation of secure seams outlining the pouches using heated dies is promoted by applying pressure and moderate seam-forming heat for a sustained time period. This condition is met and high output is realized, by using a reciprocating assembly of mutiple seam-forming dies. An assembly of seam-forming and cut-out dies is of particular value where the pouch is cut out along its seams. The seam-forming edge is heated to the desired temperature, and a cut-out die (which can readily have essentially the same shape) is heated to a higher temperature. Both the cut-out die and the seam-forming die are solidly supported. A rubbery platen presses the films against both dies. The reciprocating die assembly has plural sets of cut-out and seam-forming dies.

A pair of films of one thermoplastic material or a pair of multi-layer films having layers of thermoplastic material are disposed against each other. They are sealed together and cut out along the seal by means of a new and highly effective sealing and cutting method and apparatus. In the novel method and apparatus, a cutting die is heated to a temperature high enough to cut through the films at least largely by fusion. A body of resilient material extends along and is retained against a side surface of the cutting die for applying sealing pressure to the films adjacent the cutting die. The resilient material is heated by coduction of heat from the side surface of the cutting die. A temperature gradient develops across the exposed surface of the resilient material that applies pressure to the films. The temperature of the resilient material declines with increased distance from the cutting edge, across a narrow band. The resilient material adjacent the cutting die is heated to a temperature high enough to cause the films to seal together at and near the cutting die during a brief period of applied pressure. Cutting and sealing results from pressing the cutting and sealing die against the mutually superposed films while they are supported by a resilient counter.

The films are cut by the cutting die, and they are sealed together along the cut. The resilient quality of the materials that squeeze the films adjacent the cut accommodates swelling of the thermoplastic material adjacent the cut that is subjected to a heat-sealing temperature gradient. The resilient body that effects the seal is advantageously wide enough for its temperature to decline with increased distance from the cutting die below that which causes sealing to occur during the limited time of the applied pressure. Thus, the films are pressed together face-to-face adjacent the seal that is formed. The seal is thickened as compared to the combined thickness of the original films, and the films are not thinned and weakened adjacent the seal.

The foregoing and other features of the invention in the detailed description which follows contribute to the desired performance, but variations and substitutions may be adopted, and certain features of the invention may be utilized without others, within the spirit of the invention. Therefore it should be recognized that the following detailed description and the drawings are illustrative and should not be regarded as limiting.

In the drawings:

FIG. 5 is a fragmentary enlarged plan view of the thermoplastic strips and the discharge end of a filling nozzle of FIGS. 1–3, just as the spout of a pouch reaches a nozzle;

FIG. 5A is a film gripper shown in cross-section at the plane 5A—5A of FIG. 5;

FIG. 5B is a modified form of film gripper, shown in cross-section at the plane 5B—5B of FIG. 5;

FIG. 6 is a fragmentary plan view of the strips upon completion of a pouch-sealing operation;

FIG. 7 is a fragmentary bottom plan view of the reciprocating die assembly of FIGS. 2 and 3, drawn to larger scale;

FIG. 8 is a fragmentary cross-section of the seam-forming die assembly of FIG. 7 as viewed from the plane 8—8 of FIG. 7 but drawn to larger scale;

FIG. 9 is a block diagram of a coordinating control system for the apparatus of FIGS. 2 and 3;

FIG. 10 is a fragmentary cross-section like FIG. 8 of an alternative die assembly;

Figure 1:
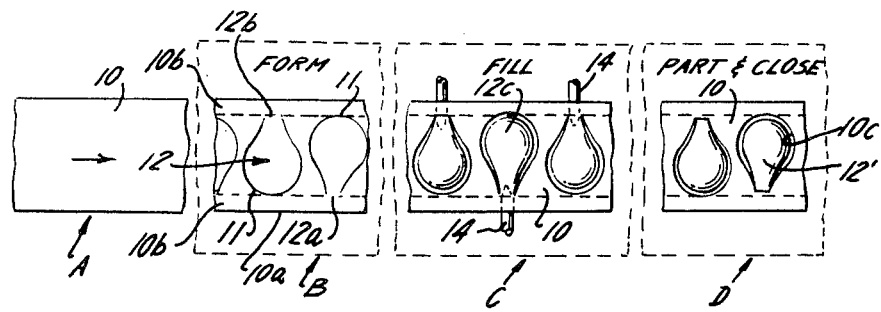
FIG. 1 represents a flow diagram of forming, filling and sealing operations for producing filled pouches.

Referring now to the drawings, an outline of the sequence of operations is represented in FIG. 1. At the left (A) there are a pair of strips 10 which are mutually confronting, i.e., disposed one over the other either in alignment with each other or slightly off-set laterally. Portions 10a of the strips are shown in FIG. 1 at (B) after seams 11 have been formed to delineate pouches 12 including spouts 12a. Gaps 12b in seams 11 afford filling openings. The spouts are directed toward opposite edges of the strips 10. The containers are filled at (C) by nozzles 14 introduced between the film edges. Filling takes place when the nozzles are disposed in alignment with the spouts. The nozzles are advanced into the spouts 12a just before the filling operation, and withdrawn from the spouts when the filling operation is done.

The seams 11 that form the pouches are confined to the zone between marginal bands 10b, as represented by the dotted lines along strips 10. There are no seams joining the films to each other anywhere along marginal bands 10b. This makes it possible to insert the nozzles 14 between the superposed strips initially, and they remain interposed between the marginal bands, not only during the filling operations but also during the advance of the strips. The nozzles are advanced into spouts 12a in preparation for the filling operation, and after each filling operation the nozzles are retracted from the spouts but not so far as to be removed from the marginal bands 10b. In this way the nozzles are ready to be projected into the newly aligned filling spouts 12a of succeeding pouches. Stationary separators can be used between opposed marginal bands (as in FIG. 5A, discussed below) and in that case, the nozzles can be retracted as far as may be expedient, clear of the strips without creating any difficulty in reinsertion of the nozzles between the films.

At (D) in FIG. 1, the spouts 12a of the filled pouches 12' are sealed shut by another die assembly, which parts the pouches from the strips 10. Holes 10c in films 10 are shown surrounding the filled pouches in FIG. 1D, but (FIG. 2) the pouches are at a lower level.

Figure 2:
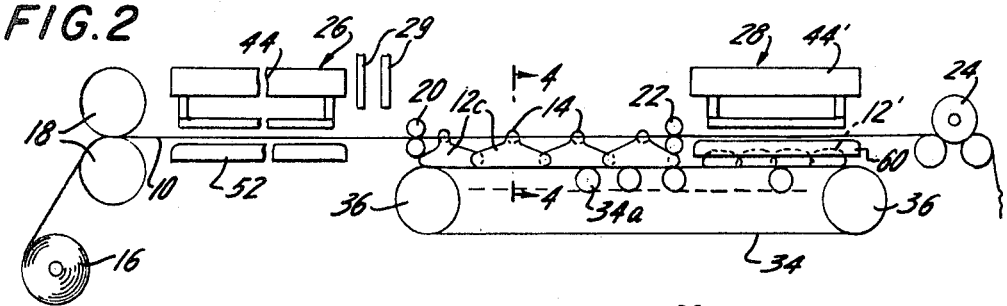
FIG. 2 is a diagrammatic elevation of illustrative apparatus for carrying out the method generally represented in FIG. 1.
Figure 3:
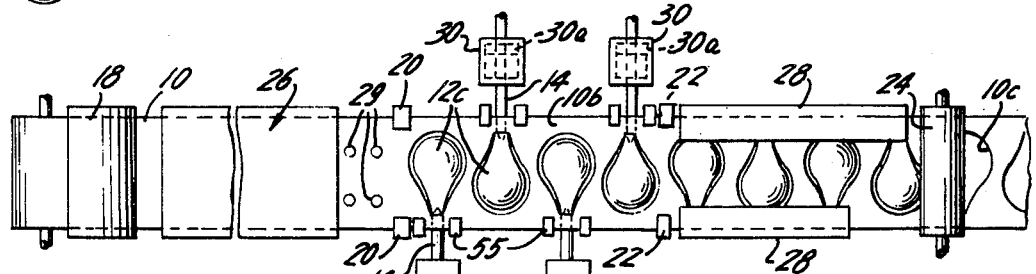
FIG. 3 is a top plan view of the apparatus of FIG. 2.

The sequence of operations in FIG. 1(A) through (D) is more fully illustrated in FIGS. 2 and 3 which include apparatus for performing the described operations. No effort is devoted to illustrating the structural supports of such apparatus or interconnections between the power drive means for the feed rollers, all of which is well within the skill of equipment builders. Such detail is unnecessary to an understanding of the invention and would tend toward prolixity.

A supply roll 16 provides paired strips 10 of thermoplastic material. A first pair of rollers 18 draws the strips from roll 16, and other sets of rollers 20, 22 and 24 advance the strips past the successive locations for forming the pouches, filling them, and finally sealing the filled pouches and parting the pouches from the strips. The rollers 20 and 22 do not engage the full width of the strips but instead they are limited to engage narrow marginal bands 10b.

Two reciprocating die assemblies 26 and 28 are disposed at spaced locations along strip 10. Each of these die assemblies includes tools for making multiple seams and for parting the pouches from the strips 10. Dies 26 form the pouches as shown in FIG. 1(A) and part the pouches incompletely from the strips. Dies 28 seal the spouts and part the spouts from the strips, thereby completing the separation of the pouches from strips 10. The dies of assembly 28 are formed to make a seam 11a (FIG. 6) across the spout 12a. Seam 11a may be located at the broad end of the filling spout where the whole filling spout is to be removed. As a further feature, the dies of die assembly 28 may also form a dart 12d in the spout, for facilitating tearing the tip of the spout away when the filling spout is to be used as a discharge spout.

It takes an appreciable time period to form seams 11, and an equal interval may be needed for making seams 11a, especially in case the confronting surfaces of the spout walls have become coated with the material injected into the pouches by nozzles 14. Each die assembly 26 and 28 may have four or six or more dies, so as to speed considerably the output of the form-fill machine. Rollers 18, 20, 22 and 24 operate intermittently to advance the strips during the intervals when die assemblies 26 and 28 are lifted away from the strips 10. Filling zone (C) may be spaced substantially from forming zone (B) and cooling jets 29 may be used to cool the seams until they become firm. Filling the pouches while the seams are soft would upset their condition that provides releasable seals in spouts as in application Ser. No. 231,288 above.

Figure 4:
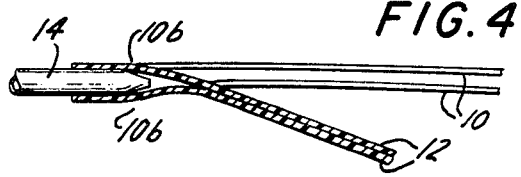
FIGS. 4 and 4A are enlarged views of the thermoplastic strips and filling nozzles as viewed from the plane 4—4 in FIG. 1, prior to a filling operation and upon completion of a filling operation, respectively.
Figure 4A:
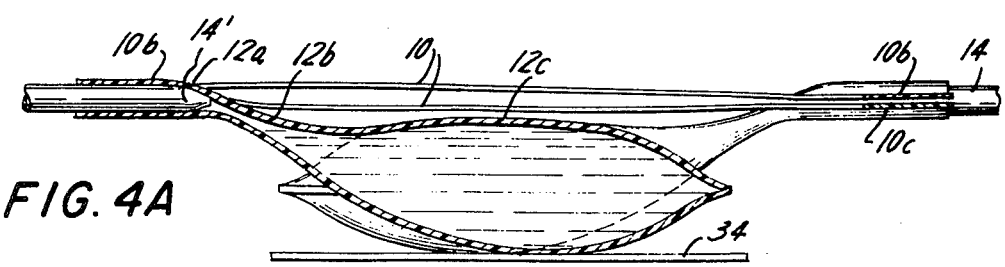

After plural pouches 12 are formed by die assembly 26, the feed rollers advance strips 10 until the filling openings 12b come into alignment with a corresponding plurality of filling nozzles 14 as illustrated in FIG. 5. Thereafter the nozzles are shifted inward (toward the center-line of strips 10) to dispose the nozzle ends 14' within respective spouts 12a (FIG. 4A and broken lines in FIG. 5). This may be accomplished by suitable actuators, for example, by means of pneumatic or hydraulic actuators 30 (FIG. 3), each having a piston 30a. Nozzle 14 (starting from its discharge end 14') extends through actuator 30 and is connected via a flexible length 31 of tubing and a fill-metering device 32 to a supply of filling material (not shown). A wide variety of suitable fill-metering devices are well known. For example, device 32 may consist of a positive-displacement pump such as a reciprocating piston-and-cylinder unit 32a having a check-valve 32b preventing reverse-flow toward the supply during a pouch-filling stroke of the pump and another check valve 32c preventing reverse-flow from the nozzle 14 toward unit 32a during a reverse stroke of unit 32a for drawing a desired quantity of liquid into the metering unit. Actuator 32e operates piston unit 32a. Where granular material or even beans or the like are to be loaded into the pouches, other known forms of suitable pouch-filling devices may be used.

During the filling operation, pouches 12 descend from the horizontal plane of strips 10 inasmuch as the pouches 12 have been parted from strips 10 everywhere except at their spout ends. Endless belt conveyor 34 including supporting idlers 34a supports the pouches as they are being filled. Conveyor 34 is trained around rollers 36. Suitable drive means (which may be the drive means of rollers 18, 20, 22 and 24) operates rollers 36 so that, following each filling operation, belt 34 supports and transports pouches 12 in coordination with the feed of strips 10 by the strip-feeding rollers and while the filled pouches remain connected to the marginal strips 10b FIGS. 1 and 5).

The filling spouts of the pouches remain connected to marginal bands 10b at the end of the filling operation, while the bodies 12c rest on the conveyor. The marginal bands may be disposed higher than the highest part of the filled pouch bodies, and in that case the pouch contents can not run out between the time when nozzles 14 are removed from the spouts and the time the spouts are sealed closed. Where the marginal band is disposed at a suitable level above the mean level of the filled pouch body (which may not be high enough to prevent liquid from pouring out), a pinch develops across the spout. In the pinch, one wall of the spout is caused to bear against the opposite wall of the spout, forming a temporary seal across the spout, preventing discharge of fluid contents from body 12c in transit from the filling zone to the sealing and cut-off die assembly 28 where a positive seal 11a is formed across the end of the spout. The pinch is especially effective as a seal where the spout is formed in accordance with the above-mentioned application Ser. No. 231,288.

The distance between the spouts is fixed by their connection to bands 10b. The seams of the body of each pouch pull generally toward the middle of the pouch as the walls of the body become distended by injected contents. This action of the seams pulling toward each other is accommodated without changing the spacing between the spouts, by virtue of the incomplete parting of the pouches from the strips prior to the filling operation. The newly formed pouches are parted from the strips everywhere except for the end portion of the spout which is limited to the region above seam 11a (FIG. 6). The cut-off die parts the spout from the strip by a transverse cut along and just above seam 11a.

As indicated above, the pouches to be formed and filled may be pouches of the type in my application Ser. No. 231,288. Such pouches have spouts that develop seals which can be released and restored repeatedly for dispensing the contents of the pouch. For spouts of that kind, the seams forming the spout are made in a manner such that the walls of the spout are essentially face-to-face (when empty) in at least that portion of the spout where the releasable seal is to form. As will be seen below, this is achieved by die assembly 26 and platen 52 at the pouch-forming zone. The heat-softened plastic of the seams should cool after the pouch-forming operation and before nozzles 14 are inserted into the spouts. This is important because the nozzles and the injected contents cause the walls of the spout to be spread apart and if this occurred while the seams were still soft, the initially established face-to-face relationship of the spout walls would be disturbed permanently. For this reason, it may be desirable to allow appreciable distance and hence travel time between the forming and filling zones, and to use cooling air jets 29, or both, particularly where the films have substantial thickness.

Pouches having spouts, e.g. fluid-discharge spouts as in application Ser. No. 231,288, can be filled by inserting a nozzle 14 into a spout 12a when the spout comes into alignment with the nozzle. Insertion of the nozzle is simplified where (as shown) the spout flares outward. Nozzles 14 are shaped to have a close fit in the spouts, where there is any danger that part of the fluid leaving the nozzle may not flow into the pouch but, instead, may flow reversely around the outside of the nozzle. Such reverse flow could result from back pressure of the fluid building up in the spout, because of a constriction that could develop in the spout or because of a high flow rate and a slender spout, or otherwise. The margins 10b of the films should be restrained to insure entry of the nozzles into the spouts when the nozzles are projected. This can be accomplished in various ways, as by grippers in the form shown in FIG. 5A or the form in FIG. 5B.

In FIG. 5A, a gripper 55 includes a series of separating wedges 55a that are stationary between marginal bands 10b of the films, suitably supported at opposite sides of all of the nozzles 14. Jaws or clamping pads 55b are mounted at opposite sides of the marginal bands 10b. Actuators 55c which may for example be powered by air-pressure, by hydraulic pressure or by electromagnets, drive jaws 55b to grip the marginal bands 10b against separators 55a. Gripping occurs just before nozzles 14 are driven into spouts 12a, under control of a coordinating timer (FIG. 9) described below. Restraint of the film margins by gripper 55 insures entry of the nozzles into the spouts when the nozzles are driven forward. When there is any problem of reverse flow of the fluid, the nozzles are proportioned for tight or snug fit in the spouts. Where wedges 55a are used, the nozzles 14 can be retracted entirely clear of the marginal bands 10b, if this is desirable for any reason, with assurance that the nozzles will have a prepared space for reentry between the films.

Gripper 55' in FIG. 5B includes jaws or clamps 55b' and suitable actuators such as those of gripper 55. Gripper 55' omits separator 55a and, accordingly, marginal bands 10b are stretched and are pulled taut around nozzles 14. Film 10 may allow easy sliding of nozzles 14 into the spouts 12b. Otherwise an antifriction exterior should be used on the nozzles, such as "Teflon", i.e. tetrafluorethylene. The taut condition of the films around the nozzles provides a further safeguard agsinst escape of the fluid from the spouts during the filling operation. In the event this clamping arrangement is used, it may be preferable to omit the flaring of the ends of the spouts shown in FIGS. 5 and 6. On the other hand, the form of gripper 55 in FIG. 5A which includes separating wedges 55a, has the advantage that the gripper does not cause the marginal bands 10b to become stretched about each nozzle before the nozzle is advanced into a spout, and therefore less force is required for pushing the nozzles forward into the spouts and less clamping pressure is needed to hold marginal bands 10b in place during forward thrust of the nozzles.

The apparatus of FIGS. 2 and 3 as thus far described is effective for carrying out the operations generally represented in FIG. 1. Dies 26 and 28 were mentioned only in general terms in the above description. Apart from the shapes of the dies, and the separation of die unit 28 into separate sections along the margins of the strips 10 as shown in FIG. 2, die assemblies 26 and 28 are alike. Accordingly, description of the dies of unit 26 will provide an understanding of both die units 26 and 28.

As seen in FIGS. 7 and 8, die unit 26 includes a main rigid panel 40 of electrical insulation, carried by rods 42. Actuating means such as one or more pistons in the head 44 (FIG. 2) of reciprocating die unit 26 drive panel 40 up and down. A seam-forming die 46 of the same shape as seam 11 is united by rivets to cut-out die 48 and to supporting rods 50 which extend through and are fixed to panel 40. Dies 46 and 48 are electrically heated by supplying current to both dies with a common electrical supply 51 connected to the extremities of the pair of dies 46 and 48. When this arrangement is used, each die serves as an electrical resistance element. Its resistivity and its cross-section are adjusted so that each die will reach a stable temperature appropriate to its function. Die 46 which is to be the cooler of the two may be of stainless steel, for example, and die 48 may be of copper. A lower value of current is carried by die 46 than by die 48. The cross-sections of these dies, as resistance elements, are to be proportioned so that each develops the desired temperature. Supports 50 should be of appropriate design to avoid significant localized cooling of the dies. A layer of thermal insulation 49 between the dies is provided to help sustain a temperature difference between the dies.

When die assembly 26 is actuated to drive sets of dies 46, 48 against strips 10 of thermoplastic material, the opposite (lower) side of the pair of strips is supported by a platen 52 that may be of rigid thermal insulation covered by a layer of heat-resistant rubbery material such as silicone rubber. The thickness of the rubbery platen cover 52a is about 1/16 inch and its hardness is 35 durometers, in a successful example. Even pressure of dies 46 and 48 against the thermoplastic strips causes die 46 to form seal 12 and causes hotter die 48 to melt and penetrate through the films. The dies and the separator between the dies may have a release coating as of "Teflon" (tetrapolyfluorethylene) or of silicone fluid that is renewed periodically or cyclically as required, by manual or other suitable means. The platen may also have a release quality. However, with some thermoplastic films and some rubbery platens, there is little need for such precautions. For example, where each strip is laminated and consists of a polyethylene layer and a nylon layer, with the polyethylene layers of the two films facing each other, the dies engage the upper nylon layer which itself serves to inhibit sticking of the strips to the sealing dies. The rubbery platen should have a limited hardness such that effective pressures of the cutting die and the seam-forming die are assured and such that the pressure of each die is made relatively uniform along its length. A range of hardness of the platen of 25 to 60 durometers is suitable for this purpose.

A plate 53 of suitable thermal insulation that is high-temperature resistant is shaped to fit closely within seal-forming die 46. Plate 53 is supported by headed rods 54 and biased by coil springs 56 against strips 10 when dies 46 and 48 are pressed against the strips for the seal-forming and cut-out operations. Plate 53 inherently acts as a stripper plate to drive each pouch 12 away from dies 46, 48 as the dies are being raised away from strips 10. Perhaps a more important function of plate 53 is in its effect of holding the walls of spout 12a virtually face-to-face adjacent the seam-forming die during the formation of the seal. Spring-biased plate 53 promotes the formation of spouts 12a which, when of proper shape, develop a kind of releasable and reclosable seal as described in my application Ser. No. 231,288.

Some form of additional stripping means at the outside of die 48 may be included if required. Resilient heat-resistant material such as foamed silicone rubber can replace plate 53, rods 54 and springs 56.

Sealing and cut-out dies like those in FIGS. 7 and 8, but shaped like seams 11*a* and 12*d* of FIG. 6, are included in die assembly 28. Platen 60 supports the films during the pressure stroke of this die assembly. Die assembly 28 and the platen 60 are divided into two sections (FIGS. 2 and 3) so as to avoid interfering with the filled pouches disposed between the die sections.

As indicated above, the customary supporting and drive-coupling structures forming part of the apparatus are not described, and are omitted from FIGS. 2 and 3, in the interest of providing a succinct specification. Coordinating means for operating the feed rollers, nozzles and dies in the manner described above are also within the skill of machinery builders. However, FIG. 9 provides a diagram of coordinating means for the various parts of the apparatus.

Timer 62 provides a control signal to the start control for the drive means 64 of the feed rollers. A stop control 66 interrupts the drive means when the strips 10 have carried a set of pouch spouts into alignment with nozzles 14 and when, at the same time, spouts 12*a* have come into proper relationship with the dies of assembly 28. The stop control may be a length-metering device to stop the feed rollers when a prescribed length of the strips has advanced, or it may be responsive to a photoelectric cell or pattern of cells, or to a pneumatic sensor cooperating with an appropriate aperture in the strips or a bump on the strips. Such feed-control indicia may be applied to the strips by die assembly 26 or otherwise, in any convenient way.

Stop control 66 is arranged to provide a signal to start the timer 62. In turn, timer 62 provides a control signal to gripper actuators 55*c* a moment after the strips 10 are arrested, then a control signal to nozzle actuators 30, and then timer 62 provides another control signal to initiate a cycle of operation of metering device 32. Concurrent with the operation of nozzle actuators 30 for inserting nozzles 14 into spouts 12*a*, timer 62 provides a signal to the actuators 44 and 44' of die assemblies 26 and 28 for applying die pressure to the strips and to sustain the die pressure for an empirically determined time interval. Thereupon the timer releases the die actuators for their die-retraction strokes and releases actuators 30 to retract the nozzles 14 and then releases grippers 55. Timer 62 then initiates another operation of the feed rollers and the conveyor. At this point timer 62 stops and is reset.

While sealing die assembly 28 has been described as being a reciprocating die assembly, and while the whole time period allotted for die assembly 26 to make seams 12 is also available for die assembly 28 to seal the spout shut, part the pouches from the strips and make the darts 12*d*, under some conditions die assembly 28 may take the form of a set of three discs adjacent each marginal band 10*b* which are rotated in coordination with feed rollers 24, and where each set of discs cooperates with a rubber-faced roller at the opposite side of strips 10 to act as a platen. One disc of each set would make a continuous seam along the strips for sealing the spouts, a second disc would part or sever bands 10*b* from the pouches and, incidentally, part the bands 10*b* from the scrap portions of the strips 10 between the pouches and the third disc would make a continuous series of darts along strips 10. The darts are to be shorter than the width of the spout and spaced apart far enough to avoid an undue weakening across the spout but sufficiently close to each other to insure at least one dart crossing one seam of each spout.

By like token, it may be feasible to replace both die assemblies 26 and 28 by rotary dies, each cooperating with a platen roll and each rotated coordinately with the feed rolls. In that case the nozzles would be modified accordingly. The nozzles could be operated in-and-out, so as to enter the spouts of the pouches, then travel with strips 10, then be retracted from the spouts and then travel reversely along strips 10 for alignment with the next spouts of pouches to be filled. The illustrated apparatus with its reciprocating die assemblies is preferred in that ample time is accorded to each seam-forming operation for assuring the desired quality of the seams. However, under some conditions the rotary form of apparatus may be suitable. The advantage of keeping the filling nozzles between marginal bands 10*b* would still be retained, and the pouch-supporting conveyor would also be retained.

A further form of die assembly 26 for forming pouches is shown in FIG. 10, useful in place of that of FIG. 8. In FIG. 10, a composite heated member 70 has heaters 72 imbedded between flat metal plates 74 and 76. Member 70 is standard for all shapes of seams and cuts to be made. Plate 74 and heater 72 can be used with various plates 76.

In FIG. 10, cutting and seal-forming dies 46*a* and 48*a* are shaped as in FIG. 7 to the outline of the desired cut and seam. Die 48*a* is a strip of metal having a relatively high thermal conductivity such as copper, and a thickness ample for transferring heat to the cutting edge from the heated plate 76. The edge of die 48*a* remote from its cutting edge is flat and bears against plate 76, and it is united to plate 76 as by a bead 78 of silver solder. The details may vary, but the design is to provide efficient heat transfer from plate 76 to die 48*a* more-or-less uniformly along the length of the die. The cutting edge of the die illustrated is defined by the intersection of its inner lateral surface (facing die 46) and sloping edge surface 80. This cross-section tends to displace plastic material away from the edges of layer 49 and die 46 when the films are fused in the cutting operation, thereby minimizing the chance of fused plastic building up at the active edges of the dies.

Heat for developing the seam-forming temperature of die 46*a* is conducted from die 48*a* through heat-insulating layer 49, which advantageously is of Teflon or the like, having the dual qualities of withstanding the temperature of the cutting die and, at its exposed edge, resisting adhesion to the plastic material of the films to be cut and seamed. Die 46*a* is a strip of metal whose thermal conductivity is relatively low, such as stainless steel. Only a limited amount of heat is transferred from plate 76 to the seam-forming edge of die 46*a*. Its temperature is raised to a value safely lower than that of cutting die 48*a* by conduction through layer 49 whose thickness is appropriate for this purpose. Die 46*a* is secured to plate 76 as by isolated tack welds, and it may be secured to die 48*a* by scattered rivets.

The cutting and sealing edges of dies 48*a* and 46*a* may be at the same plane or the cutting edge may project slightly, depending on the thickness of the films to be cut and united by seams. Rubbery platen 52*a* assures even seal-forming pressure at die 46*a* and assures penetration of cutting die 48*a* through the films, for parting them. To avoid unnecessary cooling of the dies by the films during the cutting and sealing operation (only to be reheated during the interval before the next operation) platen 52a is heated to a temperature safely below the seal-forming temperature of the thermoplastic films by plate 82 and heater 84. This feature is useful as well with the dies of FIG. 8.

A pressure plate 53a in FIG. 10 is supported by plate 76 with rods 54a and it is biased forward by springs 56a, for the purposes described in connection with plate 53 in FIG. 8.

Both in the case of the die assembly of FIG. 8 and that of FIG. 10, the temperature of the cutting dies and the temperature of the seam-forming dies should be related to the thermoplastic film and to the duration of the seam-forming time and pressure. In an example, for sealing two films of nylon-polyethylene laminate to each other, and for sealing films of nylon-ionomer laminate, a suitable seam-forming die temperature is 310° F. and a suitable cut-out die temperature is 410° F., with a pressure of 100 pounds per square inch applied for $\frac{1}{2}$ second. This is relatively low pressure in contrast with sealing-die pressures of several hundreds of pounds per square inch heretofore used with opposed metal seam-forming jaws.

Where a nylon layer is engaged by the sealing die, in the case of a nylon-polyethylene laminate, the sealing die is heated to a temperature suitable for sealing the polyethylene to the polyethylene layer of the other strip, but safely below the fusing temperature of the nylon. This avoids a tendency of the seam-forming die to stick to the nylon. In general, the layer of a laminate which is engaged by the seam-forming die should have a melting temperature at least 50° F. above the melting temperature of the layer that seals to the other film.

Figure 11:
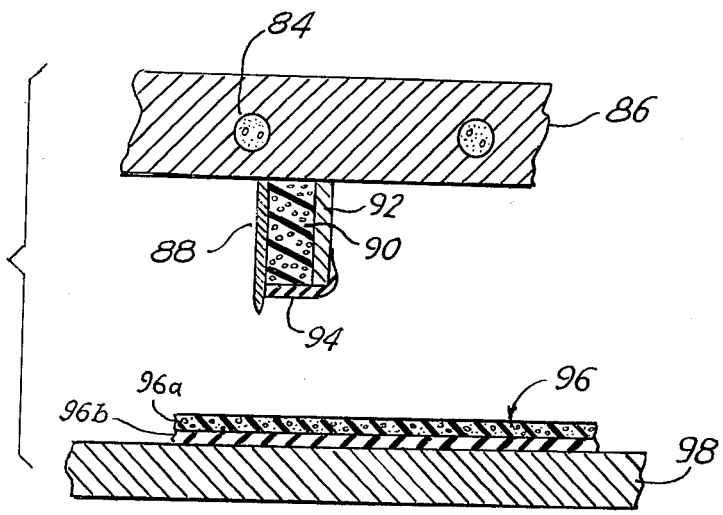
FIG. 11 is an enlarged fragmentary view of a distinctive alternative heating and sealing die embodying further features of the invention.

A novel and highly effective sealing and cutting die is shown in FIG. 11, as an improvement over those of FIGS. 8 and 10. Heaters 84 are embedded in a thick heat-conducting metal platen 86. A cutting blade 88 as of copper is suitably united as by fillets of brazing material in edge contact with platen 86, in a manner promoting efficient heat conduction to the cutting blade. A body of resilient material 90 extending all along blade 88, as of compressible, resilient foamed silicone rubber, is maintained against a side surface of heated cutting blade 88. In the form shown, another metal blade 92 is secured to platen 86 for confining body 90 against blade 88. A resilient heat-resistant coating 94 as of silicone rubber covers body 92, acting as and becoming part of that body. Coating 94 extends over the edge of blade 92, acting as a heat insulator.

Heat is conducted from blade 88 into resilient body 90/94 and develops a temperature gradient that decreases with distance from blade 88. This heat gradient is gradual, being affected by the heat that enters body 90/94 directly from platen 86 and indirectly from blade 92. The temperature that develops at the exposed surface of coating 94 opposite the edge of blade 92 ordinarily is below that which is effective to seal the films to each other, considering the poor heat-transfer from blade 92 and considering the brief period of applied pressure. Depending on its thickness and the desired temperature gradient, blade 92 may be of copper, or of steel if poorer conduction of heat from platen 86 is desired; and blade 92 may even take the form of heat-resistant rigid cement whose thermal conductivity is still lower than that of steel.

Figure 12:
FIG. 12 is a greatly enlarged cross-section of films cut and sealed together using the die of FIG. 11.

Films to be sealed together are supported on a resilient heat-resistant counter 96 as of layered foam and solid silicone rubber that is supported on flat, rigid plate 98. The die assembly is pressed against the films for a brief period. During that time, cutting blade 88 penetrates through the films due to its high temperature. The blade is not normally razor-sharp and the pressure at the cutting edge is inadequate for die-cutting the films. The cutting edge projects a short extent from the exposed surface of coating 94. Body 90/94 presses against and fuses together a margin of the films along their cut edge(s). There is a temperature gradient across the pressure-applying surface of the silicone coating 94 such that, during the time of pressure application, the portions of the film directly opposite blade 92 are normally not heated sufficiently to fuse them together. The material of the films closest to blade 88 is heated to a relatively high temperature such that the films become fused together along relatively wide seams. Advantageously, there is no thinning and weakening of the film at the transition of the seal to the unaffected film area. The yielding quality of the body 90/94 and of counter 96 accommodate thickening that tends to occur. This effect is enhanced by the compressibility of the foamed rubber in the seal-forming die and in the counter. A greatly enlarged typical cross-section of films sealed together in the manner described is shown in FIG. 12. Notably, the thickened seam is much wider than it is thick, and the seam is substantially thicker than the combined original thicknesses of the films.

In an example, body 90 is $\frac{1}{8}$ inch thick (measured perpendicular to blade 88), coating 94 is 0.040 inch thick, and blade 88 is $\frac{1}{2}$-inch-wide copper that is 0.025 inch thick and projects about 0.015 to 0.030 inch from the surface of coating 94. Counter 96 is formed of 1/16 foamed silicone rubber 96a on 1/16 inch solid silicone rubber 96b. Blade 90 is 0.05 inch thick steel, having poor heat conductivity compared to the high heat conductivity of copper blade 88. This apparatus is eminently suitable for sealing a pair of films each being 0.003 to 0.005 inch thick. In typical use, blade 88 is heated to about 100° F. to 300° F. higher than the melting temperature of the films.

The kind of die shown is especially suitable to being shaped as may be needed for making curved cut and sealed seams. The apparatus and method described in connection with FIGS. 11 and 12 are effective with simple films as of polyethylene and polypropylene, and with laminated films as of nylon-polyethylene and polyester-polyethylene, as well as with films having a thin metal lamination. The cutting edge breaks through such metal laminations as part of the method.

Variations in the foregoing illustrative embodiments and varied applications of the novel features thereof will occur to those skilled in the art and therefore the invention should be construed broadly in accordance with its full spirit and scope.

I claim:

1. Apparatus for making a seal between a pair of films and concurrently penetrating the films along the seal, including a resilient counter for supporting an assembled pair of films each of which has thermoplastic material facing the other film, a severing blade and means for heating the severing blade to a temperature high enough to penetrate the films at least largely by fusion, a body of resilient material of poor heat conductivity compared to that of the severing blade and means for holding the body of resilient material against a lateral surface of the severing blade and thereby providing for heat transfer from the blade to the body of resilient material and producing a temperature gradient at the film-engaging surface of said body that declines with distance from the blade, and means for pressing the blade and the body of resilient material against the assembled films on the counter to cause the blade to penetrate the films and to cause the resilient body to bear against and seal the films together adjacent the outline penetrated by said blade, the body of resilient material and the resilient counter accommodating thickening of the seal being formed.

2. Apparatus as in claim 1 wherein said body of resilient material is compressible.

3. Apparatus for forming articles of superposed thermoplastic strips, including a die assembly having a cutting strip and a sealing strip of heat-conductive material assembled to each other in fixed relationship with a layer of heat-insulating material interposed therebetween, adjacent edges of said heat-conductive strips being shaped in accordance with the outline of articles to be formed thereby, means including a rubbery member for pressing superposed thermoplastic strips against said edges, and means for heating said cutting strip to a stable temperature high enough to fuse and penetrate through the thermoplastic strips and for heating the sealing strip only to a temperature high enough to form a seam between superposed thermoplastic strips during briefly sustained applied pressure of said rubbery member said heating means comprising a metal member having an essentially flat surface supporting the edges of said heat-conductive strips opposite to the cutting and sealing edges thereof, said cutting strip being of a metal of high thermal conductivity, and said sealing strip being of a metal whose thermal conductivity is substantially lower than that of said cutting strip.

4. The method of making a seal between a pair of films and, concurrently, penetrating the films along the seal, including the steps of assembling a pair of films each having at least a layer of thermoplastic material facing the other film, supporting said films on a resilient counter, heating a severing blade to a temperature high enough to penetrate the films at least largely by fusion, retaining a body of resilient material of poor heat conductivity against a lateral surface of the severing blade, thereby to establish heat-transfer from the blade to said body of resilient material and producing a temperature gradient at the film-engaging surface of the body that decreases with distance from the blade, and pressing the blade against the films on the counter to cause the blade to penetrate the films and thereupon to cause the resilient body to bear against and seal the films together adjacent the outline penetrated by said blade while accommodating thickening of the seal being formed.

5. The method as in claim 4 wherein the temperature gradient and the time of pressure application are regulated to limit the width of the seal to less than the width of said film engaging surface but greater than the combined thicknesses of the films.

6. The method as in claim 5 wherein said temperature gradient and the bearing of the resilient body against the films is continued so that the films are heated to seal-forming temperature over a width of seal substantially greater than the combined initial thickness of the films.

7. The method as in either of claims 4 and 6 wherein said resilient body is compressible.

8. Apparatus for making a seam uniting a pair of films having opposed thermoplastic material and cutting the films along the seam, including a resilient counter, and a severing and sealing die comprising a severing blade of high thermal conductivity, a body of resilient heat-resistant material extending along said blade against a side surface thereof to be heated thereby, means for heating said blade to a temperature effective upon application of moderate pressure to cause severing of the films, and means for retaining said body of resilient material against said severing blade, the severing blade having a severing edge that projects a short extent from a film-engaging portion of said body of resilient material so that said films are subjected to pressure in a zone adjacent said blade between said resilient counter and said body of resilient material when said severing edge has penetrated said films, said heating of said blade causing heating of said body of resilient material but causing only reduced heating of the films with increasing distance from said severing blade, said die thus being adapted for forming a marginal seam between said films that extends only partway from the blade across said pressure zone while portions of the films in the pressure zone remote from the severing blade are subjected to pressure during formation of the seam but remain unsealed.

9. Apparatus as in claim 8, wherein said body of heat-resistant material is at least partly of foamed material, whereby it is compressible.

* * * * *